United States Patent
Asayama et al.

(10) Patent No.: US 11,250,553 B2
(45) Date of Patent: Feb. 15, 2022

(54) DEPOSIT DETECTION DEVICE AND DEPOSIT DETECTION METHOD

(71) Applicant: DENSO TEN Limited, Kobe (JP)

(72) Inventors: Nobunori Asayama, Kobe (JP); Nobuhisa Ikeda, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/019,853

(22) Filed: Sep. 14, 2020

(65) Prior Publication Data
US 2021/0090237 A1     Mar. 25, 2021

(30) Foreign Application Priority Data
Sep. 20, 2019 (JP) .............................. JP2019-172215

(51) Int. Cl.
*G06K 9/00* (2006.01)
*G06T 7/00* (2017.01)
*G06T 7/11* (2017.01)

(52) U.S. Cl.
CPC .............. *G06T 7/0002* (2013.01); *G06T 7/11* (2017.01); *G06T 2207/10152* (2013.01); *G06T 2207/30168* (2013.01); *G06T 2207/30252* (2013.01)

(58) Field of Classification Search
CPC ................... G06T 7/0002; G06T 7/11; G06T 2207/10152; G06T 2207/30168; G06T 2207/30252
USPC ....................................................... 382/100
See application file for complete search history.

(56) References Cited

U.S. PATENT DOCUMENTS

| | | | |
|---|---|---|---|
| 5,436,979 A * | 7/1995 | Gray .................... | G06T 5/20 348/92 |
| 6,233,364 B1 * | 5/2001 | Krainiouk .............. | G06T 5/20 382/205 |
| 9,288,381 B2 * | 3/2016 | Irie .................... | G02B 27/0006 |
| 9,924,051 B2 * | 3/2018 | Kubota ................ | G06F 3/1285 |
| 10,191,356 B2 * | 1/2019 | Laroia ................ | H04N 5/35563 |
| 10,791,252 B2 * | 9/2020 | Tsurube ................ | H04N 7/18 |
| 11,055,871 B2 * | 7/2021 | Uemura ................ | G06T 5/50 |
| 2014/0010408 A1 * | 1/2014 | Irie .................... | G06T 7/0002 382/103 |

(Continued)

FOREIGN PATENT DOCUMENTS

JP     2006-157740 A     6/2006

*Primary Examiner* — Jonathan S Lee
(74) *Attorney, Agent, or Firm* — Oliff PLC

(57) ABSTRACT

A deposit detection device according to an embodiment includes a calculation module, an extraction module, and a decision module. The calculation module calculates a brightness average for each of small regions into which a predetermined region of an image captured by an imaging device is divided. The extraction module extracts, as a high-brightness region, the small region in which the brightness average calculated by the calculation module is equal to or larger than a predetermined value. The decision module decides on a brightness threshold value for detecting a deposit region corresponding to a deposit adhering to the imaging device, based on the area of the high-brightness region extracted by the extraction module.

5 Claims, 6 Drawing Sheets

(56) References Cited

U.S. PATENT DOCUMENTS

2015/0201120 A1\* 7/2015 Irie ................. H04N 5/225
348/148
2020/0082559 A1\* 3/2020 Uemura ............ G06T 7/0002

\* cited by examiner

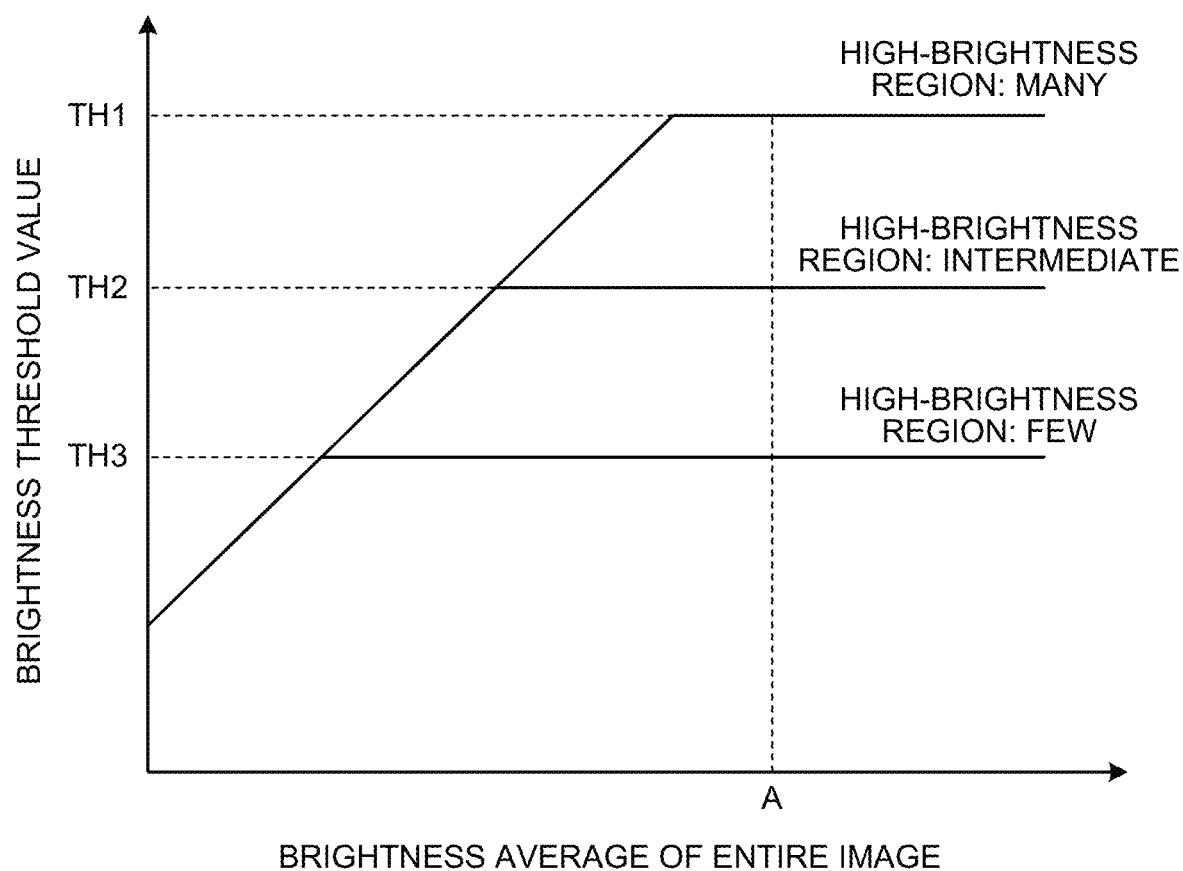

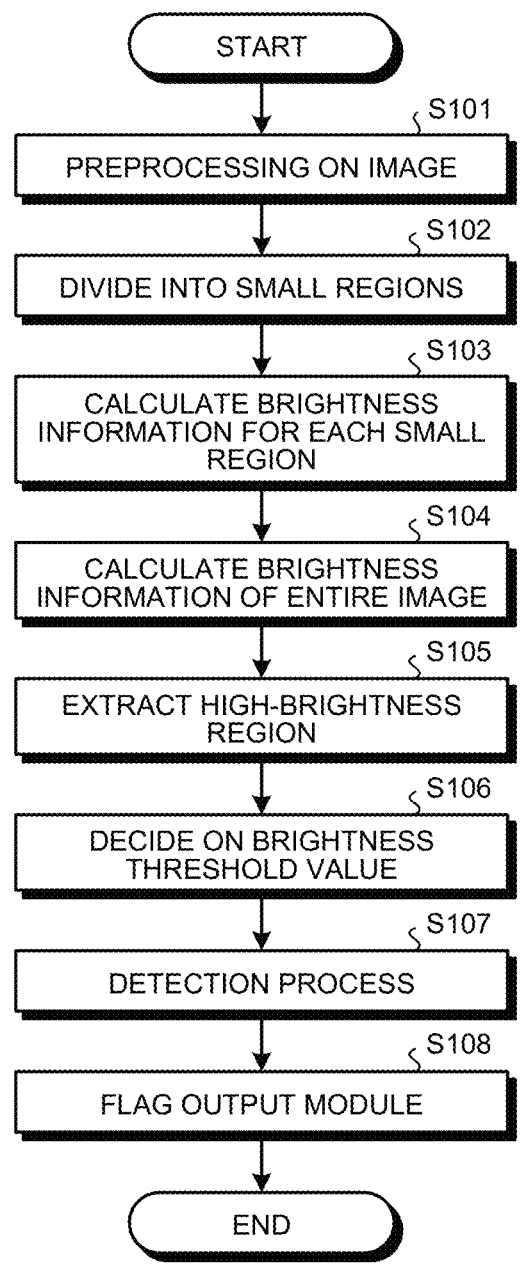

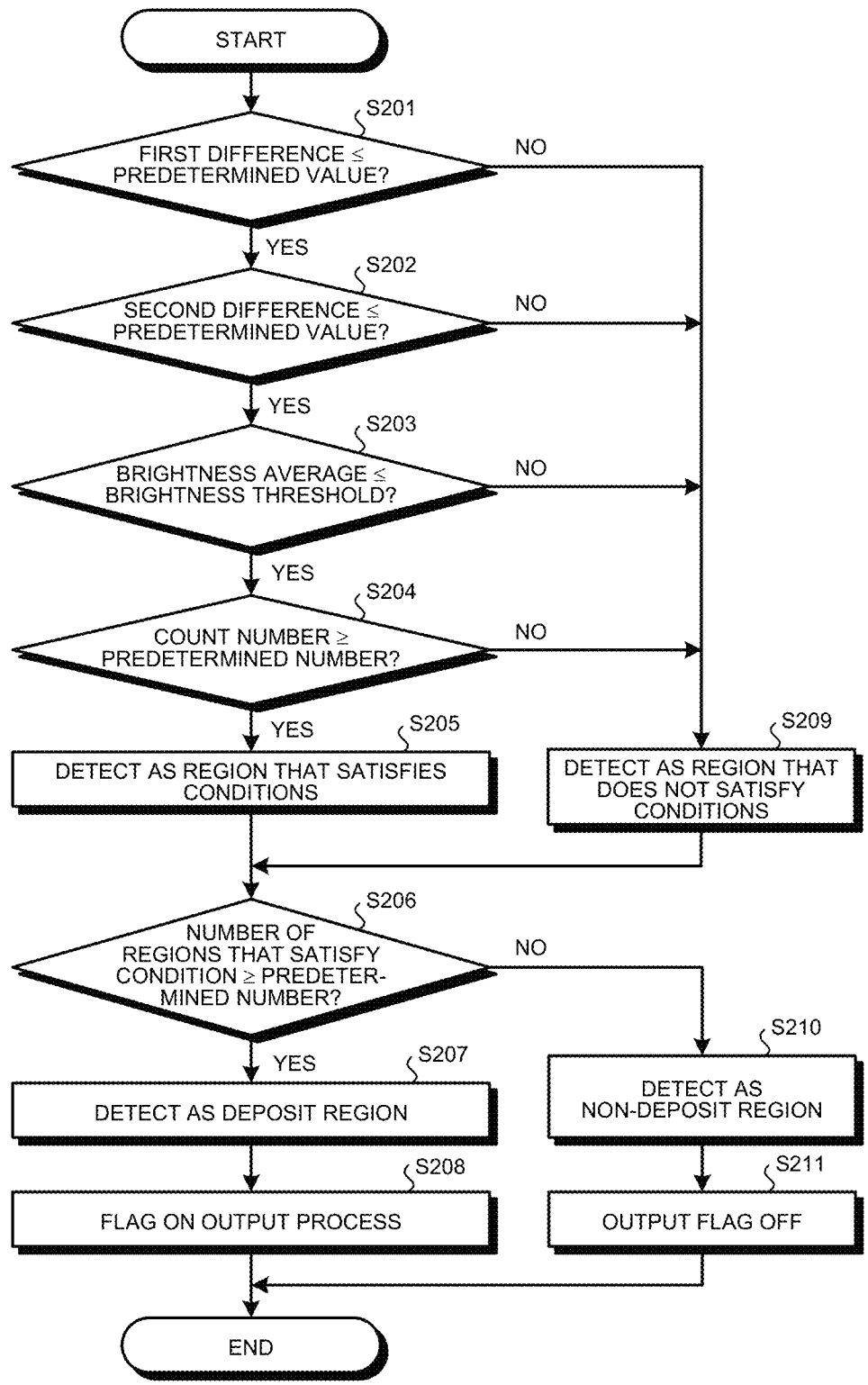

DEPOSIT DETECTION DEVICE AND DEPOSIT DETECTION METHOD

CROSS-REFERENCE TO RELATED APPLICATION

This application is based upon and claims the benefit of priority of the prior Japanese Patent Application No. 2019-172215, filed on Sep. 20, 2019, the entire contents of which are incorporated herein by reference.

FIELD

The embodiments discussed herein are directed to a deposit detection device and a deposit detection method.

BACKGROUND

Conventionally, a deposit detection device is known which detects a region corresponding to a deposit adhering to a lens of an imaging device (hereinafter, deposit region), based on a brightness value of an image captured by the imaging device (for example, refer to Japanese Laid-open Patent Publication No. 2006-157740).

When a deposit adheres to a large part of a lens, gain control to elevate the brightness of the entire image is sometimes performed in the imaging device. Since this gain control also makes the brightness of a deposit region higher, conventionally, a threshold value for detecting a deposit region is changed according to the brightness of the entire image.

Unfortunately, conventionally, when gain control is performed in a state in which a deposit does not adhere, a region with low brightness may be erroneously detected as a deposit region.

SUMMARY

A deposit detection device according to an embodiment includes a calculation module, an extraction module, and a decision module. The calculation module calculates a brightness average for each of small regions into which a predetermined region of an image captured by an imaging device is divided. The extraction module extracts, as a high-brightness region, the small region in which the brightness average calculated by the calculation module is equal to or larger than a predetermined value. The decision module decides on a brightness threshold value for detecting a deposit region corresponding to a deposit adhering to the imaging device, based on the area of the high-brightness region extracted by the extraction module.

BRIEF DESCRIPTION OF DRAWINGS

FIG. 4 is a diagram illustrating an example of threshold value information;

FIG. 5 is a flowchart illustrating a procedure of the whole process performed by the deposit detection device according to the embodiment; and FIG. 6 is a flowchart illustrating a procedure of a detection process performed by the deposit detection device according to the embodiment.

DESCRIPTION OF EMBODIMENTS

Embodiments of a deposit detection device and a deposit detection method disclosed by the subject application will be described in detail below with reference to the accompanying drawings. It should be noted that the present invention is not limited by the embodiments illustrated below.

Figure 1A:
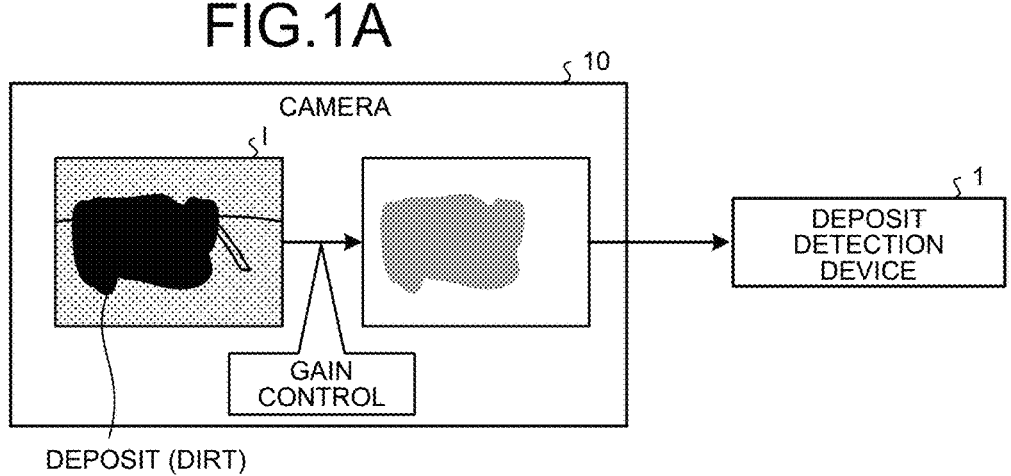
FIG. 1A is a diagram illustrating an overview of a deposit detection method according to an embodiment.
Figure 1B:
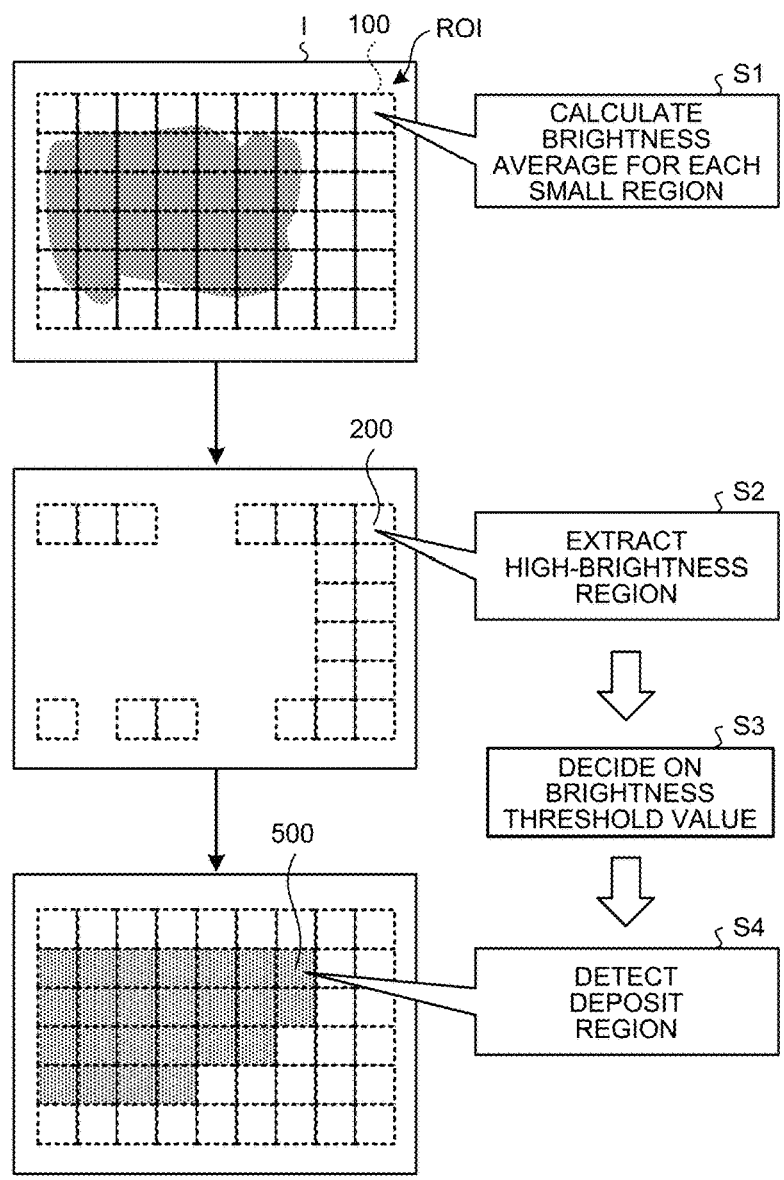
FIG. 1B is a diagram illustrating an overview of the deposit detection method according to the embodiment.

First, referring to FIG. 1A and FIG. 1B, an overview of the deposit detection method according to an embodiment will be described. FIG. 1A and FIG. 1B are diagrams illustrating an overview of the deposit detection method according to the embodiment. The upper section of FIG. 1B illustrates an image I (hereinafter, captured image I) captured, for example, in a state in which a light-blocking deposit such as dirt adheres to a lens of a camera (an example of imaging device) mounted on a vehicle. When such a light-blocking deposit adheres, a deposit region in the captured image I is in a blocked-up shadow state.

As illustrated in FIG. 1A, a deposit detection device 1 according to the embodiment acquires a captured image I captured by a camera 10 mounted on a vehicle, for example, and detects a light-blocking deposit adhering to a lens of the camera 10 based on the captured image I. The light-blocking deposit is, for example, a region of dirt, insects, and the like, in other words, a region in which a deposit region is a blocked-up shadow.

Here, the camera 10 may perform automatic gain control to elevate (make higher) the brightness of the entire image, for example, when the brightness of the entire image of the captured image I is low. In this case, as illustrated in FIG. 1A, in the captured image I subjected to gain control, the brightness of the deposit region becomes higher and the brightness of the region other than the deposit also becomes higher.

Conventionally, a threshold value for detecting a deposit region is changed according to the brightness of the entire image, using the characteristic of gain control making the brightness of a deposit region higher. However, conventionally, when gain control to elevate the brightness is performed in a state in which a deposit does not adhere, the threshold value of brightness is changed to be higher and therefore a region with low brightness or the like may be erroneously detected as a deposit region.

Then, in the deposit detection method according to the embodiment, a threshold value of brightness (hereinafter, brightness threshold value) is decided on based on the area of a high-brightness region with high brightness in the captured image I after gain control. Referring now to FIG. 1B, an overview of the deposit detection method according to the embodiment will be described.

As illustrated in FIG. 1B, in the deposit detection method according to the embodiment, first of all, an average value of brightness (brightness average) is calculated for each of small regions 100 into which a predetermined region ROI of the captured image I is divided (step S1). The method of setting the predetermined region ROI and the small regions 100 will be described later with reference to FIG. 3.

Subsequently, in the deposit detection method according to the embodiment, the small region 100 in which the calculated brightness average is equal to or larger than a predetermined value is extracted as a high-brightness region 200 (step S2). The high-brightness region is, for example, a blown-out highlight region.

Subsequently, in the deposit detection method according to the embodiment, a brightness threshold value for detecting a deposit region 500 is decided on based on the area of the extracted high-brightness region 200 (step S3). The area of the high-brightness region 200 corresponds to, for example, the number of high-brightness regions 200.

In the deposit detection method according to the embodiment, the deposit region 500 is then detected using the decided brightness threshold value (step S4). Specifically, in the deposit detection method according to the embodiment, when the small region 100 satisfies all of the following conditions (1) to (3), the small region 100 is detected as the deposit region 500. When the small region 100 does not satisfy at least one of the conditions (1) to (3), the small region 100 is detected as a non-deposit region in which a deposit does not adhere.

(1) The difference in brightness average from the captured image I in the past is equal to or smaller than a predetermined value.

(2) The difference in standard deviation of brightness from the captured image I in the past is equal to or smaller than a predetermined value.

(3) The brightness average of the small region 100 in the captured image I at present is equal to or smaller than the brightness threshold value.

In this way, in the deposit detection method according to the embodiment, when the camera 10 performs gain control to elevate the brightness of the entire image, a brightness threshold value is decided on by using the characteristic of producing the high-brightness region 200 having the area according to the degree of gain control.

In the deposit detection method according to the embodiment, therefore, since the degree of gain control can be grasped from the area of the high-brightness region 200, a brightness threshold value can be decided on with high accuracy. That is, the deposit detection method according to the embodiment can detect a deposit with high accuracy.

In the deposit detection method according to the embodiment, a brightness threshold value is decided on based on the area of the high-brightness region 200 and the brightness of the entire image, which will be described in detail later with reference to FIG. 4.

Figure 2:
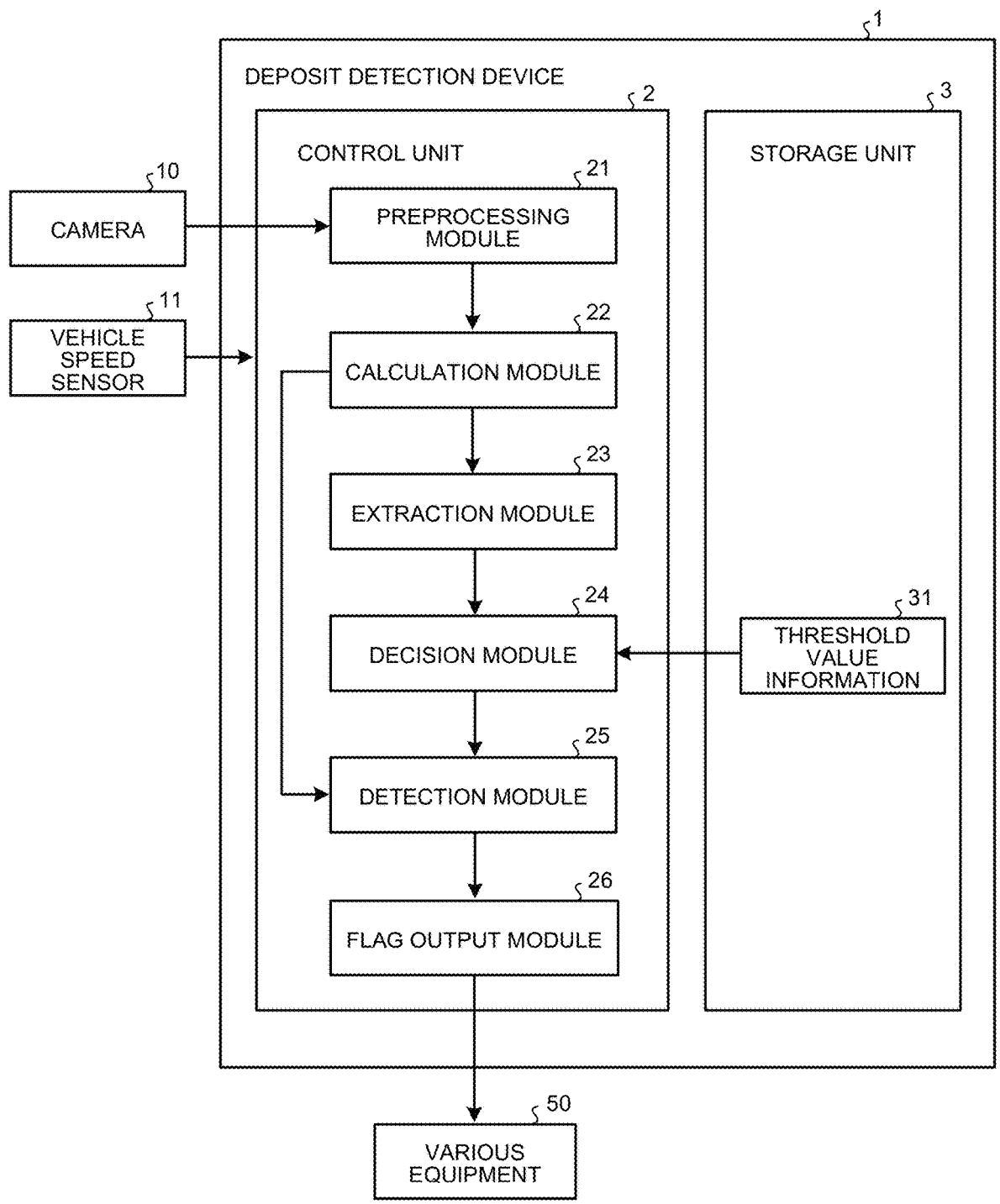
FIG. 2 is a block diagram illustrating a configuration of a deposit detection device according to the embodiment.

Referring now to FIG. 2, a configuration of the deposit detection device 1 according to an embodiment will be described. FIG. 2 is a block diagram illustrating the configuration of the deposit detection device 1 according to an embodiment. As illustrated in FIG. 2, the deposit detection device 1 according to an embodiment is connected with the camera 10, a vehicle speed sensor 11, and various equipment 50. Although the deposit detection device 1 illustrated in FIG. 2 is a separate component from the camera 10 and the various equipment 50, the deposit detection device 1 may be integrated with at least one of the camera 10 and the various equipment 50.

The camera 10 is, for example, an on-vehicle camera including a lens such as a fish-eye lens and an imager such as a charge-coupled device (CCD) or a complementary metal oxide semiconductor (CMOS). The cameras 10 are provided, for example, at positions where images at the front side, the back side, the left side and the right side of the vehicle can be captured, and output the captured images I to the deposit detection device 1. The camera 10 performs gain control on the captured image I, if necessary, before outputting the captured image I to the deposit detection device 1.

The vehicle speed sensor 11 is a sensor that detects the speed of the vehicle. The vehicle speed sensor 11 outputs information on the detected vehicle speed to the deposit detection device 1.

The various equipment 50 acquires the detection result from the deposit detection device 1 to perform a variety of control on the vehicle. The various equipment 50 includes, for example, a display device indicating that a deposit adheres to the lens of the camera 10 and notifies the user of an instruction to wipe off the deposit, a removal device that ejects fluid, gas, or the like toward the lens to remove the deposit, and a vehicle control device for controlling autonomous driving, for example.

As illustrated in FIG. 2, the deposit detection device 1 according to the embodiment includes a control unit 2, a volatile storage unit 3, and a nonvolatile storage unit 4. The control unit 2 includes a preprocessing module 21, a calculation module 22, an extraction module 23, a decision module 24, a detection module 25, and a flag output module 26. The storage unit 3 stores therein threshold value information 31.

Here, the deposit detection device 1 includes, for example, a computer having a central processing unit (CPU), a read-only memory (ROM), a random-access memory (RAM), a flash memory, and an input-output port, and a variety of circuits.

The CPU of the computer reads and executes a computer program stored in the ROM, for example, to function as the preprocessing module 21, the calculation module 22, the extraction module 23 the decision module 24, the detection module 25, and the flag output module 26 of the control unit 2.

At least one or all of the preprocessing module 21, the calculation module 22, the extraction module 23 the decision module 24, the detection module 25, and the flag output module 26 of the control unit 2 may be configured by hardware such as an application specific integrated circuit (ASIC) and a field-programmable gate array (FPGA).

The storage unit 3 corresponds to, for example, a RAM, a ROM, or a flash memory. The RAM, the ROM, or the flash memory can store therein the threshold value information 31, information on a variety of computer programs, and the like. The deposit detection device 1 may acquire the computer programs and a variety of information described above through another computer connected via a wired or wireless network or a portable recording medium.

The threshold value information 31 stored in the storage unit 3 is information including threshold values for detecting the deposit region 500 by the detection module 25 described later, and a threshold value to be used for a detection process by the detection module 25 is decided on from among these threshold values by the decision module 24 described later. The detail of the threshold value information 31 will be described later with reference to FIG. 4.

The preprocessing module 21 performs predetermined preprocessing on the captured image I captured by the camera 10. The captured image I acquired by the preprocessing module 21 is the image after automatic gain control is performed.

As a specific example of preprocessing, the preprocessing module 21 performs a pixel thinning process on the acquired captured image I and generates an image having a size smaller than the acquired image. The preprocessing module 21 also generates an integrated image of the sum and the sum of squares of pixel values in the pixels, based on the image subjected to the thinning process. As used herein, the pixel value is information corresponding to brightness or an edge of a pixel.

In this way, the deposit detection device 1 can accelerate calculation in the processes in the subsequent stages by performing the thinning process on the acquired image and generating the integrated image and can reduce the process time for detecting a deposit.

The preprocessing module 21 may perform a smoothing process for each pixel, using a smoothing filter such as an averaging filter. The preprocessing module 21 does not necessarily perform the thinning process and may generate an integrated image of the captured image I having the same size as that of the acquired image.

The preprocessing module 21 outputs the captured image I that is an integrated image to the calculation module 22.

Figure 3:
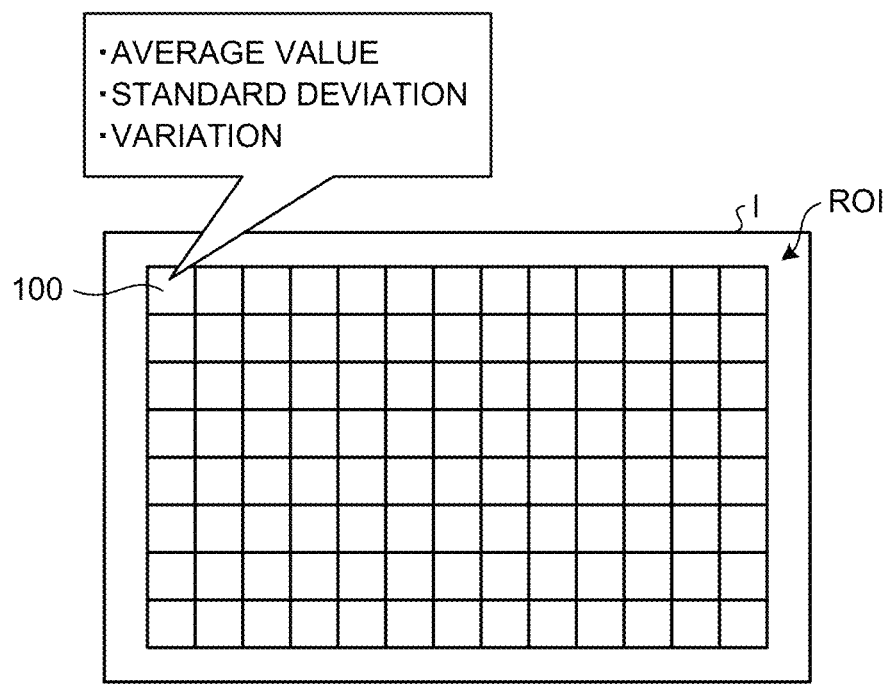
FIG. 3 is a diagram illustrating a process in a calculation module.

The calculation module 22 calculates brightness information indicating a feature amount of brightness for each of the small regions 100 into which a predetermined region ROI of the captured image I is divided. Referring now to FIG. 3, a process in the calculation module 22 will be described. FIG. 3 is a diagram illustrating the process in the calculation module 22.

As illustrated in FIG. 3, the calculation module 22 first sets the predetermined region ROI and the small regions 100 in the captured image I. The predetermined region ROI is a rectangular region preset according to the characteristics of the camera 10 and is a region, for example, excluding a vehicle body region and a housing region of the camera 10. The small regions 100 are rectangular regions formed by dividing the predetermined region ROI in the horizontal direction and the vertical direction. For example, each small region 100 is a region including 40×40 pixels, but the number of pixels included in the small region 100 can be set as desired.

Subsequently, the calculation module 22 calculates brightness information indicating a feature amount of brightness for each small region 100. Specifically, the calculation module 22 calculates an average value of brightness (brightness average) and a standard deviation of brightness (brightness standard deviation) as a feature amount, for each small region 100. The calculation module 22 also calculates a feature amount of brightness (an average value of brightness and a standard deviation of brightness) in the entire predetermined region ROI.

Subsequently, the calculation module 22 calculates a variation in feature amount of brightness in the captured images I from the past to the present. Specifically, the calculation module 22 calculates, as a variation, a first difference that is a difference in average value of brightness in the small region 100 at the same position in the past and at present in the captured images I. That is, the calculation module 22 calculates, as a variation, the first difference between the average value of brightness in the past and the average value of brightness at present for the corresponding small region 100.

The calculation module 22 also calculates a second difference that is a difference in standard deviation of brightness in the small region 100 at the same position in the past and at present of the captured images I. That is, the calculation module 22 calculates, as a variation, the second difference between the standard deviation of brightness in the past and the standard deviation of brightness at present for the corresponding small region 100.

The calculation module 22 outputs the calculated brightness information to the extraction module 23 and the detection module 25.

The extraction module 23 extracts, as the high-brightness region 200, the small region 100 in which the brightness average calculated by the calculation module 22 is equal to or larger than a predetermined value. For example, the extraction module 23 extracts the high-brightness region 200 from among the small regions 100 included in the predetermined region ROI, excluding a vehicle body region (body region) corresponding to the vehicle body. With this configuration, the high-brightness region 200 can be extracted with high accuracy through gain control. The extraction module 23 outputs information on the extracted high-brightness region 200 to the decision module 24.

The decision module 24 decides on a brightness threshold value for detecting the deposit region 500 corresponding to a light-blocking deposit adhering to the lens of the camera 10, based on the area of the high-brightness region 200 extracted by the extraction module 23.

A decision process for a brightness threshold value by the decision module 24 will now be described with reference to FIG. 4. FIG. 4 is a diagram illustrating an example of the threshold value information 31. In the graph illustrated in FIG. 4, the horizontal axis represents the brightness average of the entire image and the vertical axis represents the brightness threshold value.

The decision module 24 decides on a brightness threshold value to be used in the detection process by the detection module 25, based on the threshold value information 31. Specifically, the decision module 24 decides on a brightness threshold value based on the number of high-brightness regions 200 extracted by the extraction module 23. More specifically, the decision module 24 decides on an upper limit value of the brightness threshold value in accordance with the number of high-brightness regions 200. For example, the decision module 24 decides on the upper limit value such that the larger the number of high-brightness regions 200 is, the higher the upper limit value is.

The decision module 24 then decides on a brightness threshold value in a range of the decided upper limit value, based on the brightness average of the entire image. For example, when the brightness average of the entire image is "A", the decision module 24 decides on a threshold value TH1 as the brightness threshold value if the number of high-brightness regions 200 is equal to or larger than a predetermined large-number threshold value (high-brightness regions: many).

When the brightness average of the entire image is "A", the decision module 24 decides on a threshold value TH2 as the brightness threshold value if the number of high-brightness regions 200 is equal to or larger than a predetermined intermediate threshold value (high-brightness regions: intermediate).

When the brightness average of the entire image is "A", the decision module 24 decides on a threshold value TH3 as the brightness threshold value if the number of high-brightness regions 200 is smaller than a predetermined smallnumber threshold value or zero (high-brightness regions: few).

In this way, the decision module 24 decides on a brightness threshold value based on the brightness average of the entire image (the entire region of the captured image I) and the number (area) of high-brightness regions 200, whereby a brightness threshold value can be decided on with high accuracy. Since the number of high-brightness regions 200 is treated as the area, an arithmetic process for calculating the area is unnecessary. That is, a brightness threshold value is decided on based on the number of high-brightness regions 200, whereby the process load on the control unit 2 can be suppressed.

Although in FIG. 4, the upper limit value of the brightness threshold value is decided on by three levels (threshold values TH1, TH2, and TH3), the upper limit value may be decided on by two or less levels or by four or more levels.

The decision module 24 outputs the decided brightness threshold value to the detection module 25.

The detection module 25 detects the deposit region 500 based on the brightness threshold value decided on by the decision module 24. Specifically, the detection module 25 determines whether the small region 100 satisfies all of the following conditions (1) to (3). When the small region 100 does not satisfy at least one of the conditions (1) to (3), the small region 100 is detected as a non-deposit region in which a deposit does not adhere.

(1) The first difference of the small region 100 is equal to or smaller than a predetermined value.

(2) The second difference of the small region 100 is equal to or smaller than a predetermined value.

(3) The brightness average of the small region 100 is equal to or smaller than the brightness threshold value.

Subsequently, when the number of small regions 100 in which a count number indicating the number of times all of the conditions (1) to (3) above are satisfied is equal to or larger than a predetermined number is equal to or larger than a predetermined number, the detection module 25 detects the predetermined number of small regions 100 as the deposit region 500. That is, the detection module 25 detects, as the deposit region 500, a set of the predetermined number of small regions 100 in which the state of satisfying all of the conditions (1) to (3) continues a predetermined number of times or more.

The detection module 25 outputs information on the detected deposit region 500 to the flag output module 26.

The flag output module 26 outputs a deposit flag ON to the various equipment 50 when the deposit region 500 is detected by the detection module 25. On the other hand, the flag output module 26 outputs a deposit flag OFF to the various equipment 50 when the deposit region 500 is not being detected by the detection module 25, that is, a non-deposit region is detected.

Referring now to FIG. 5 and FIG. 6, a procedure of a process performed by the deposit detection device 1 according to the embodiment will be described. FIG. 5 is a flowchart illustrating a procedure of the whole process performed by the deposit detection device 1 according to the embodiment. FIG. 6 is a flowchart illustrating a procedure of the detection process performed by the deposit detection device 1 according to the embodiment.

First referring to FIG. 5, the whole process performed by the deposit detection device 1 according to the embodiment will be described.

As illustrated in FIG. 5, the preprocessing module 21 performs preprocessing on the captured image I (step S101). As used herein, the preprocessing is a process of performing the gray-scale process and the thinning process and thereafter generating an integrated image based on pixel values of the reduced image.

Subsequently, the calculation module 22 divides a predetermined region ROI in the captured image I into small regions 100 (step S102).

Subsequently, the calculation module 22 calculates brightness information indicating a feature amount of brightness for each of the small regions 100 (step S103). The feature amount of brightness is, for example, an average value of brightness and a standard deviation of brightness.

Subsequently, the calculation module 22 calculates brightness information indicating a feature amount of brightness of the entire image (step S104).

Subsequently, the extraction module 23 extracts, as the high-brightness region 200, the small region 100 in which the brightness average of the small region 100 calculated by the calculation module 22 is equal to or larger than a predetermined value (step S105).

Subsequently, the decision module 24 decides on a brightness threshold value for the detection process by the detection module 25, based on the area of the high-brightness region 200 extracted by the extraction module 23 (step S106).

Subsequently, the detection module 25 performs the detection process of detecting the deposit region 500, using the brightness threshold value decided on by the decision module 24 (step S107).

Subsequently, the flag output module 26 outputs a deposit flag corresponding to the detection result by the detection module 25 to the various equipment 50 (step S108) and terminates the process.

Referring now to FIG. 6, the detection process performed by the deposit detection device 1 according to the embodiment will be described.

First, the detection module 25 determines whether the first difference of the small region 100 is equal to or smaller than a predetermined value (step S201).

If the first difference is equal to or smaller than a predetermined value (Yes at step S201), the detection module 25 determines whether the second difference of the small region 100 is equal to or smaller than a predetermined value (step S202).

If the second difference is equal to or smaller than the predetermined value (Yes at step S202), the detection module 25 determines whether the brightness average of the small region 100 is equal to or smaller than a brightness value (step S203).

If the brightness average of the small region 100 is equal to or smaller than the brightness value (Yes at step S203), the detection module 25 increments a count number indicating the number of times the conditions of step S201 to step S203 are satisfied, and determines whether the incremented count number is equal to or larger than a predetermined number (step S204).

If the count number is equal to or larger than the predetermined number (Yes at step S204), the detection module 25 detects the small region 100 as a region (small region 100) that satisfies the conditions (step S205).

Subsequently, the detection module 25 determines whether the number of regions that satisfy the conditions is equal to or larger than a predetermined number (step S206).

If the number of regions that satisfy the conditions is equal to or larger than the predetermined number (Yes at step S206), the detection module 25 detects the predetermined number of small regions 100 as the deposit region 500 (step S207).

Subsequently, if the deposit region 500 is detected, the flag output module 26 outputs the deposit flag ON (step S208) and terminates the process.

On the other hand, if the first difference exceeds the predetermined value at step S201 (No at step S201), the detection module 25 detects the small region 100 as a region that does not satisfy the conditions (step S209).

If the second difference exceeds the predetermined value at step S202 (No at step S202), the detection module 25 proceeds to step S209.

If the brightness average exceeds the brightness threshold value at step S203 (No at step S203), the detection module 25 proceeds to step S209.

If the count number is smaller than the predetermined number at step S204 (No at step S204), the detection module 25 proceeds to step S209.

If the number of regions that satisfy the conditions is smaller than the predetermined number at step S206 (No at step S206), the detection module 25 detects the predetermined region ROI as a non-deposit region (step S210).

Subsequently, if a non-deposit region is detected, the flag output module 26 outputs a deposit flag OFF (step S211) and terminates the process.

As described above, the deposit detection device 1 according to the embodiment includes the calculation module 22, the extraction module 23, and the decision module 24. The calculation module 22 calculates a brightness average for each of small regions 100 into which a predetermined region ROI of the captured image I captured by the imaging device (camera 10) is divided. The extraction module 23 extracts, as the high-brightness region 200, the small region 100 in which the brightness average calculated by the calculation module 22 is equal to or larger than a predetermined value. The decision module 24 decides on a brightness threshold value for detecting the deposit region 500 corresponding to a light-blocking deposit adhering to the imaging device, based on the area of the high-brightness region 200 extracted by the extraction module 23. With this configuration, a deposit can be detected with high accuracy.

In the foregoing embodiment, the captured image I captured by a camera mounted on a vehicle is used. However, the captured image I may be, for example, a captured image I captured by a security camera or a camera installed on a street lamp. That is, the captured image I may be any captured image captured by a camera with a lens to which a deposit may adhere.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A deposit detection device comprising:
   a calculation module configured to calculate a brightness average for each of small regions into which a predetermined region of an image captured by an imaging device is divided;
   an extraction module configured to extract, as a high-brightness region, the small region in which the brightness average calculated by the calculation module is equal to or larger than a predetermined value; and
   a decision module configured to decide on a brightness threshold value for detecting a deposit region corresponding to a deposit adhering to the imaging device, based on an area of the high-brightness region extracted by the extraction module.

2. The deposit detection device according to claim 1, wherein the decision module decides on the brightness threshold value based on number of the high-brightness regions extracted by the extraction module.

3. The deposit detection device according to claim 1, wherein
   the calculation module calculates a brightness average of the entire predetermined region, and
   the decision module decides on the brightness threshold value, based on a brightness average of an entire region of the image and the area of the high-brightness region.

4. The deposit detection device according to claim 1, wherein the extraction module extracts the high-brightness region from among the small regions excluding a body region corresponding to a vehicle body, in the predetermined region.

5. A deposit detection method comprising:
   calculating a brightness average for each of small regions into which a predetermined region of an image captured by an imaging device is divided;
   extracting, as an high-brightness region, the small region in which the brightness average calculated at the calculating is equal to or larger than a predetermined value; and
   deciding on a brightness threshold value for detecting a deposit region corresponding to a deposit adhering to the imaging device, based on an area of the high-brightness region extracted at the extracting.

* * * * *